(12) United States Patent
Maehara et al.

(10) Patent No.: US 11,282,226 B2
(45) Date of Patent: Mar. 22, 2022

(54) WATER LEVEL MEASUREMENT DEVICE AND SHORELINE EXTRACTION METHOD

(71) Applicant: Mitsubishi Electric Corporation, Tokyo (JP)

(72) Inventors: Hideaki Maehara, Tokyo (JP); Mengxiong Wang, Tokyo (JP); Momoyo Hino, Tokyo (JP); Hidetoshi Mishima, Tokyo (JP); Eiji Ueda, Tokyo (JP); Tetsuro Wada, Tokyo (JP); Kenji Taira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/634,847

(22) PCT Filed: May 8, 2018

(86) PCT No.: PCT/JP2018/017766
§ 371 (c)(1),
(2) Date: Jan. 28, 2020

(87) PCT Pub. No.: WO2019/044040
PCT Pub. Date: Mar. 7, 2019

(65) Prior Publication Data
US 2020/0202556 A1  Jun. 25, 2020

(30) Foreign Application Priority Data
Aug. 30, 2017  (JP) .............................. JP2017-165718

(51) Int. Cl.
G06K 9/62  (2006.01)
G06T 7/73  (2017.01)
(Continued)

(52) U.S. Cl.
CPC .............. *G06T 7/73* (2017.01); *G01F 23/292* (2013.01); *G06T 7/97* (2017.01);
(Continued)

(58) Field of Classification Search
CPC ............ G06T 7/73; G06T 7/97; G01F 23/292
(Continued)

(56) References Cited

U.S. PATENT DOCUMENTS

2010/0014776 A1* 1/2010 Marchesotti ............ G06T 5/007
382/275
2011/0268329 A1  11/2011 Pronkine
(Continued)

FOREIGN PATENT DOCUMENTS

JP   2001-281046 A   10/2001
JP   2007-256254 A   10/2007
(Continued)

OTHER PUBLICATIONS

Extended European Search Report, dated Jul. 22, 2020, for European Application No. 18852242.9.
(Continued)

*Primary Examiner* — Stephen P Coleman
(74) *Attorney, Agent, or Firm* — Birch, Stewart, Kolasch & Birch, LLP

(57) ABSTRACT

An object of the present invention is to provide a water level measurement device and a shoreline extraction method each of which is capable of stably measuring the water level. A pixel selection unit (11) selects a pixel of interest (302) from a designated area (301) designated from a captured image (300), and an identification image extraction unit (12) extracts identification images (303), (304) each coming in contact with the pixel of interest (302). The identification unit (13) calculates an identification strength indicating a degree to which an area corresponding to each of the
(Continued)

identification images (303), (304) is a water area, on a basis of the result of machine learning related to identification between the water area and a non-water area. The shoreline extraction unit (14) extracts a shoreline in the captured image from the identification strength of the area corresponding to each of the identification images (303), (304), on a basis of the result of machine learning related to the identification between the water area and the non-water area by the learning unit (17).

9 Claims, 15 Drawing Sheets

(51) Int. Cl.
  *G06T 7/00* (2017.01)
  *G01F 23/292* (2006.01)
(52) U.S. Cl.
  CPC .............. *G06T 2207/20081* (2013.01); *G06T 2207/30181* (2013.01); *G06T 2207/30232* (2013.01)
(58) Field of Classification Search
  USPC ........................................................ 382/159
  See application file for complete search history.

(56) References Cited

U.S. PATENT DOCUMENTS

| | | | |
|---|---|---|---|
| 2012/0070071 A1* | 3/2012 | Rankin | G06K 9/00805 |
| | | | 382/154 |
| 2012/0269381 A1* | 10/2012 | Choo | G08B 21/18 |
| | | | 382/100 |
| 2013/0301901 A1 | 11/2013 | Satish et al. | |

FOREIGN PATENT DOCUMENTS

| | | |
|---|---|---|
| JP | 2012-514751 A | 6/2012 |
| JP | 6125137 B1 | 5/2017 |
| JP | 2017-146268 A | 8/2017 |
| WO | WO 2016/071281 A1 | 5/2016 |

OTHER PUBLICATIONS

European Office Action for European Application No. 18852242.9, dated Mar. 25, 2021.

Office Action dated Sep. 9, 2021 in corresponding Indian Patent Application No. 202047005455.

* cited by examiner

FIG. 6
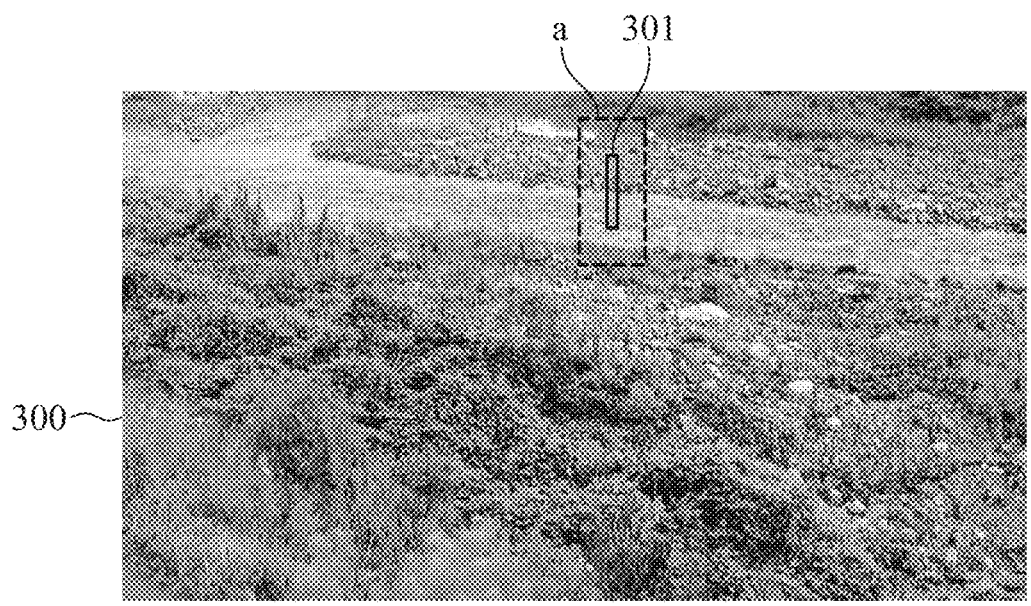
FIG. 7A     FIG. 7B
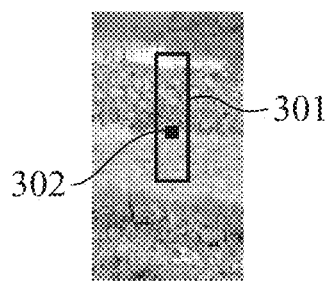 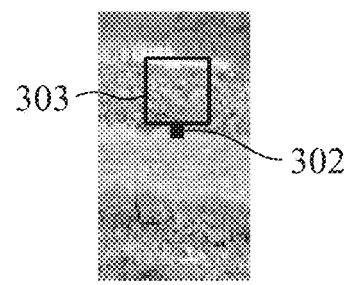
FIG. 7C
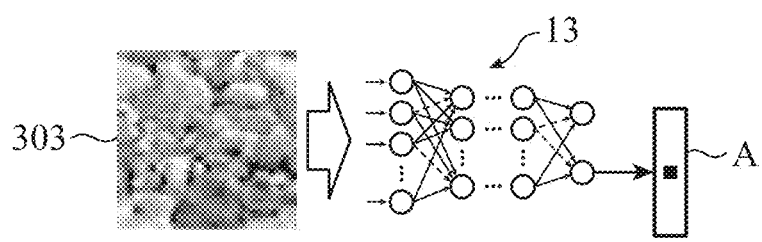

Position p Of Shoreline

WATER LEVEL MEASUREMENT DEVICE AND SHORELINE EXTRACTION METHOD

TECHNICAL FIELD

The present invention relates to a water level measurement device that measures the water level of a river or the like, and a shoreline extraction method.

BACKGROUND ART

Conventionally, there is known a technology for measuring the water level of a river by using an image captured by a monitoring camera. For example, Patent Literature 1 describes a water level measurement method in which an image that includes a water gauge board arranged in a river is captured by a monitoring camera, and the water level of the river is measured by using the captured image.

CITATION LIST

Patent Literatures

Patent Literature 1: JP 2001-281046 A

SUMMARY OF INVENTION

Technical Problem

According to the water level measurement method described in Patent Literature 1, a position of the water gauge board is identified on the basis of luminance distribution in the captured image, and the water level is measured on the basis of the identified position.

However, the processing of identifying a position of the water gauge board only on the basis of the luminance distribution results in instability of specific accuracy. Therefore, in the water level measurement method described in Patent Literature 1, there is a high possibility that an error will occur in a measurement result, and thus there arises a problem that measurement is unstable.

The present invention has been made to solve the above-described problem, and an object of the present invention is to obtain a water level measurement device and a shoreline extraction method each of which is capable of stably measuring the water level.

Solution to Problem

A water level measurement device according to the present invention is provided with processing circuitry. The processing circuitry selects a pixel of interest from an image area designated from a captured image captured by a monitoring camera. The processing circuitry extracts, as identification images, a plurality of respective image areas that come in contact with the pixel of interest selected. The processing circuitry calculates an identification strength indicating a degree to which an area corresponding to each of the plurality of identification images is a water area, on the basis of the result of machine learning related to identification between the water area and a non-water area. The processing circuitry extracts a shoreline in the captured image on the basis of the identification strength calculated. The processing circuitry calculates the water level within an image capturing range of the monitoring camera on the basis of a shoreline extracted.

Advantageous Effects of Invention

According to the present invention, a plurality of image areas that come in contact with a pixel of interest is extracted as respective identification images, and a shoreline in a captured image is extracted, on the basis of an identification strength of an area corresponding to each of the plurality of identification images, the identification strength being based on a result of machine learning related to identification between a water area and a non-water area. It is possible to obtain a water level measurement device and a shoreline extraction method each of which is capable of stable water level measurement by calculating the water level on the basis of a position of the shoreline.

BRIEF DESCRIPTION OF DRAWINGS

FIG. 6 is a drawing illustrating an example of a captured image in the first embodiment.

FIG. 7A is a drawing illustrating an image area designated from the captured image. FIG. 7B is a drawing illustrating an identification image that comes in contact with the top of a pixel of interest. FIG. 7C is a drawing illustrating an outline of identification processing of identifying between a water area and a non-water area on the identification image of FIG. 7B.

DESCRIPTION OF EMBODIMENTS

First Embodiment

Figure 1:
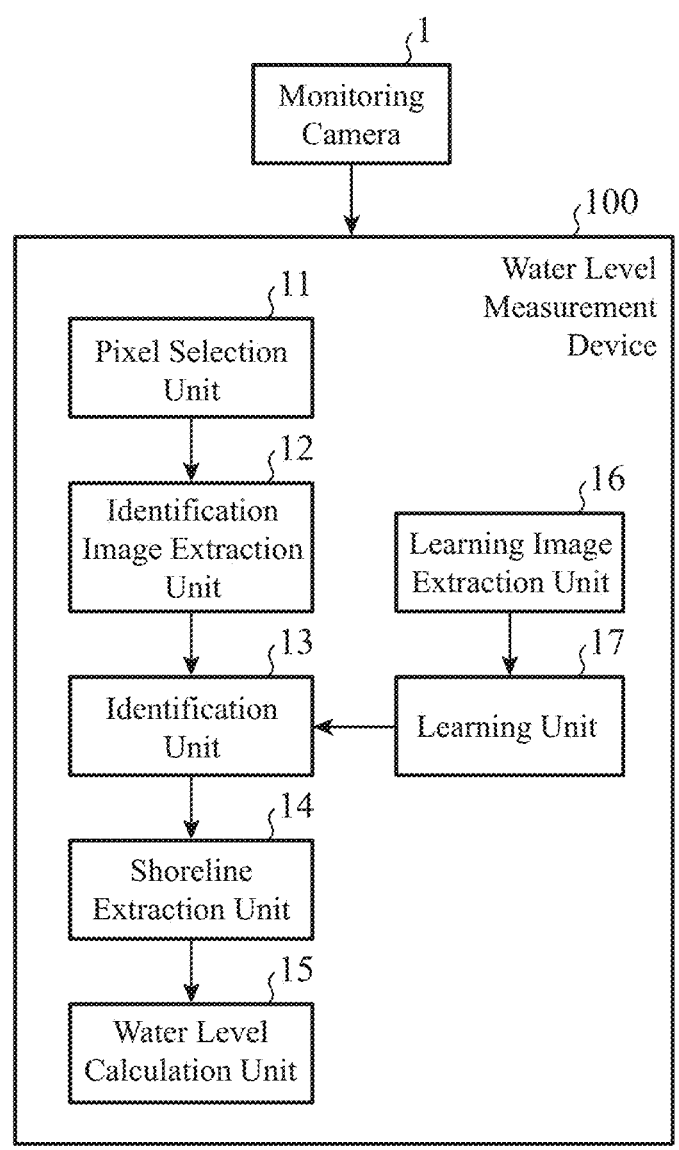
FIG. 1 is a block diagram illustrating a configuration of a water level measurement device according to a first embodiment of the present invention.

FIG. 1 is a block diagram illustrating a configuration of a water level measurement device 100 according to a first embodiment of the present invention. The water level measurement device 100 is a device that measures the water level of a river by using images captured by a monitoring camera 1, and is provided with a pixel selection unit 11, an identification image extraction unit 12, an identification unit 13, a shoreline extraction unit 14, a water level calculation unit 15, a learning image extraction unit 16, and a learning unit 17.

The monitoring camera 1 is arranged around a river or the like that is a target of water level measurement, and captures an image of the target of the water level measurement. A range of an image capturing target (hereinafter referred to as "image capturing range") by the monitoring camera 1 includes water of a river, objects other than the river such as a riverside, and a shoreline that is a boundary between the water of the river and the riverside. An image captured by the monitoring camera 1 is referred to as "captured image". Image data showing the captured image is output from the monitoring camera 1 to the water level measurement device 100.

The pixel selection unit 11 selects a pixel of interest from an image area (hereinafter referred to as "designated area") designated from a captured image captured by the monitoring camera 1.

For example, the pixel selection unit 11 identifies a designated area having 32×128 pixels from the captured image, and selects a pixel of interest from among pixels in the above-described designated area. Data indicating the pixel of interest selected by the pixel selection unit 11 is output to the identification image extraction unit 12.

The identification image extraction unit 12 extracts, as identification images, a plurality of respective image areas that come in contact with the pixel of interest selected by the pixel selection unit 11. For example, the identification image extraction unit 12 extracts, as an identification image, a 64×64 pixel image that comes in contact with the top of the pixel of interest, and extracts, as an identification image, a 64×64 pixel image that comes in contact with the bottom of the pixel of interest, in a two-dimensional image plane of the captured image. Data indicating the identification images extracted by the identification image extraction unit 12 is output to the identification unit 13.

The identification unit 13 calculates an identification strength, on the basis of a result of machine learning related to identification between a water area and a non-water area by the learning unit 17. The water area is an area that shows water of a river in an image, and the non-water area is an area that shows objects other than the river in the image.

The identification strength is a value indicating a degree to which an area corresponding to each of a plurality of identification images is a water area. For example, in a case where the area corresponding to the identification image is a water area, the identification strength is 1.0, and in a case where the area corresponding to the identification image is a non-water area, the identification strength is 0.0. In addition, in a case where the identification image shows a water area and a non-water area, the identification strength is 0.5.

The shoreline extraction unit 14 extracts a shoreline in the captured image on the basis of the identification strength calculated by the identification unit 13. For example, in a case where one point of the water's edge on the opposite shore shown in the captured image is a pixel of interest, an identification image that comes in contact with the top of the pixel of interest is an image that shows land (non-water area), and therefore the identification strength is a value close to 0.0. An identification image that comes in contact with the bottom of the pixel of interest is an image that shows a water area, and therefore the identification strength is a value close to 1.0. The shoreline extraction unit 14 performs subtraction using an identification strength of each of the plurality of identification images that come in contact with the above-described pixel of interest, and extracts pixels of interest each of whose identification strength is the maximum value (peak value), as pixels corresponding to the shoreline. The shoreline extraction unit 14 traces these pixels, and extracts the shoreline shown in the captured image.

The water level calculation unit 15 calculates the water level within the image capturing range of the monitoring camera 1 on the basis of a position of the shoreline extracted by the shoreline extraction unit 14. For example, correspondence data in which each pixel position of a pixel column in the up-and-down direction in the two-dimensional image plane of the designated area described above is associated with a water level value of the river is set in the water level calculation unit 15. The water level calculation unit 15 calculates a water level value of the river with reference to the correspondence data, on the basis of a pixel position corresponding to the shoreline.

The learning image extraction unit 16 extracts a learning image from the captured image captured by the monitoring camera 1. For example, the learning image extraction unit 16 extracts, as a learning image, an image area in which water of the river is shown from the captured image, and further extracts, as a learning image, an image area in which objects other than the river is shown from the captured image.

The learning unit 17 executes machine learning related to identification between a water area and a non-water area by using the learning image extracted by the learning image extraction unit 16. For example, the learning unit 17 executes machine learning that uses a deep neural network (hereinafter referred to as "D/L"). A result of the machine learning by the learning unit 17 is output to the identification unit 13.

The water level measurement device 100 provided with the pixel selection unit 11, the identification image extraction unit 12, the identification unit 13, the shoreline extraction unit 14, the water level calculation unit 15, the learning image extraction unit 16 and the learning unit 17 has been described above. However, the configuration of the water level measurement device 100 is not limited to this configuration.

For example, the learning image extraction unit 16 and the learning unit 17 may be configured to be included in an external device that is provided independently of the water level measurement device 100. In this case, the identification unit 13 performs identification processing by using the result of machine learning performed in the external device.

In other words, the water level measurement device 100 according to the first embodiment has only to be provided with the pixel selection unit 11, the identification image extraction unit 12, the identification unit 13, the shoreline extraction unit 14 and the water level calculation unit 15. Thus, the learning image extraction unit 16 and the learning unit 17 may be excluded from the configuration of the water level measurement device 100.

Figure 2A:
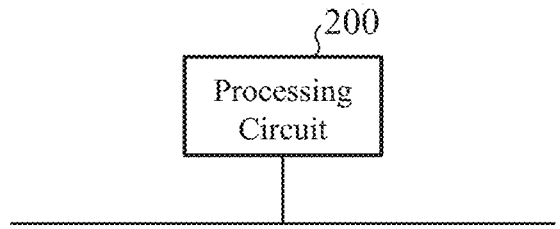
FIG. 2A is a block diagram illustrating a hardware configuration that implements a function of the water level measurement device according to the first embodiment.
Figure 2B:
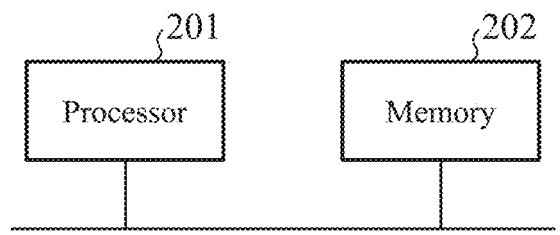
FIG. 2B is a block diagram illustrating a hardware configuration that executes software for implementing a function of the water level measurement device according to the first embodiment.

FIG. 2A is a block diagram illustrating a hardware configuration that implements functions of the water level measurement device 100. FIG. 2B is a block diagram illustrating a hardware configuration that executes software for implementing the functions of the water level measurement device 100. The respective functions of the pixel selection unit 11, the identification image extraction unit 12, the identification unit 13, the shoreline extraction unit 14, the water level calculation unit 15, the learning image extraction unit 16 and the learning unit 17 in the water level measurement device 100 are implemented by a processing circuit.

In other words, the water level measurement device 100 is provided with the processing circuit for executing selection processing of a pixel of interest, extraction processing of an identification image, identification processing and shoreline extraction processing.

The processing circuit may be a dedicated hardware, or may be a central processing unit (CPU) that executes a program stored in a memory 202.

In a case where the processing circuit is dedicated hardware shown in FIG. 2A, for example, a single circuit, a composite circuit, a programmed processor, a parallel-programmed processor, an application specific integrated circuit (ASIC), a field-programmable gate array (FPGA), or a combination of these components, is applicable to a processing circuit 200.

The respective functions of the pixel selection unit 11, the identification image extraction unit 12, the identification unit 13, the shoreline extraction unit 14, the water level calculation unit 15, the learning image extraction unit 16 and the learning unit 17 may be implemented by separate processing circuits, or these functions may be collectively implemented by one processing circuit.

In a case where the processing circuit is a processor 201 shown in FIG. 2B, the respective functions of the pixel selection unit 11, the identification image extraction unit 12, the identification unit 13, the shoreline extraction unit 14, the water level calculation unit 15, the learning image extraction unit 16 and the learning unit 17 are implemented by software, firmware, or a combination of software and firmware. Software or firmware is described as programs, and the programs are stored in the memory 202.

The processor 201 implements the respective functions of the pixel selection unit 11, the identification image extraction unit 12, the identification unit 13, the shoreline extraction unit 14, the water level calculation unit 15, the learning image extraction unit 16 and the learning unit 17, by reading the programs stored in the memory 202, and then by executing the programs.

In other words, the water level measurement device 100 is provided with the memory 202 for storing the programs that are executed by the processor 201 with the result that selection of a pixel of interest, extraction of an identification image, identification processing and shoreline extraction are each executed.

These programs cause a computer to execute steps or methods of the pixel selection unit 11, the identification image extraction unit 12, the identification unit 13, the shoreline extraction unit 14, the water level calculation unit 15, the learning image extraction unit 16 and the learning unit 17.

The memory 202, for example, corresponds to a non-volatile or volatile semiconductor memory such as a random access memory (RAM), a read only memory (ROM), a flash memory, an erasable programmable read only memory (EPROM) or an electrically-EPROM (EEPROM), or corresponds to a magnetic disk, a flexible disk, an optical disk, a compact disk, a MiniDisk, or a DVD.

Some of the respective functions of the pixel selection unit 11, the identification image extraction unit 12, the identification unit 13, the shoreline extraction unit 14, the water level calculation unit 15, the learning image extraction unit 16 and the learning unit 17 may be implemented by dedicated hardware, and some of them may be implemented by software or firmware.

For example, the functions of the pixel selection unit 11, the identification image extraction unit 12, the identification unit 13, the shoreline extraction unit 14 and the water level calculation unit 15 may be implemented by the processing circuit 200 that is dedicated hardware, and the functions of the learning image extraction unit 16 and the learning unit 17 may be implemented by reading the programs stored in the memory 202, and then by executing the programs, by the processor 201. In this manner, the processing circuit is capable of implementing each of the above-described functions by hardware, software, firmware, or a combination thereof.

Figure 3:
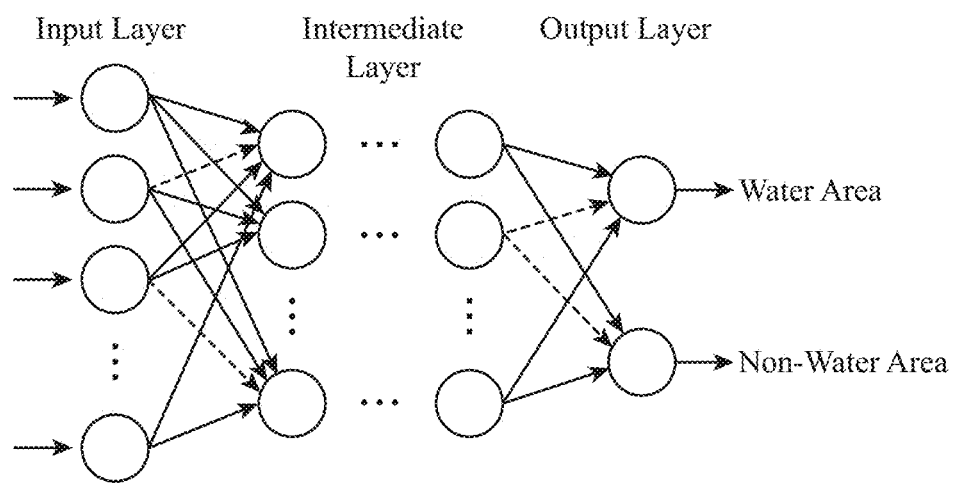
FIG. 3 is a diagram illustrating a structure of a deep neural network related to identification between a water area and a non-water area.

FIG. 3 is a diagram illustrating a structure of a D/L related to identification between a water area and a non-water area in the identification unit 13. The D/L is one of mechanisms by which a plurality of learning images is input into a computer together with correct answers so as to cause the computer to learn the learning images and the correct answers, thereby to identify whether or not an object shown in image data newly input is a specific target, and to output a result of the identification.

More specifically, the D/L is a computation model in which a plurality of perceptrons is hierarchically arranged. The perceptron obtains the weighted sum of input signals, and outputs the weighted sum to which a nonlinear function that is called an activation function is applied.

For example, when two-dimensional signals corresponding to an image is input into a perceptron, the perceptron calculates the weighted sum of the input signals to output the weighted sum to a perceptron of the next layer.

In the D/L shown in FIG. 3, the plurality of perceptrons is hierarchically arranged, and input signals input into an input layer are processed in each of a plurality of layers in an intermediate layer, and consequently an identification result is calculated. An output layer corresponds to the output of a task to be identified, in the case of a regression task, output of the activation function is used as an estimated value as it is, and in the case of a classification task, a soft max function is applied to the output layer before output is performed.

The D/L learning by the learning unit 17 is performed by using error back propagation. For example, stochastic gradient descent is used. The error back propagation is processing in which an output error of D/L is successively propagated toward the previous layers from the output layer, and the weights are updated.

It should be noted that the learning unit 17 has only to use a model in which machine learning related to identification between a water area and a non-water area can be executed for input of a learning image. For example, a convolutional neural network, a support vector machine (SVM) and the like can be mentioned as the model.

Next, operation will be described.

Figure 4:
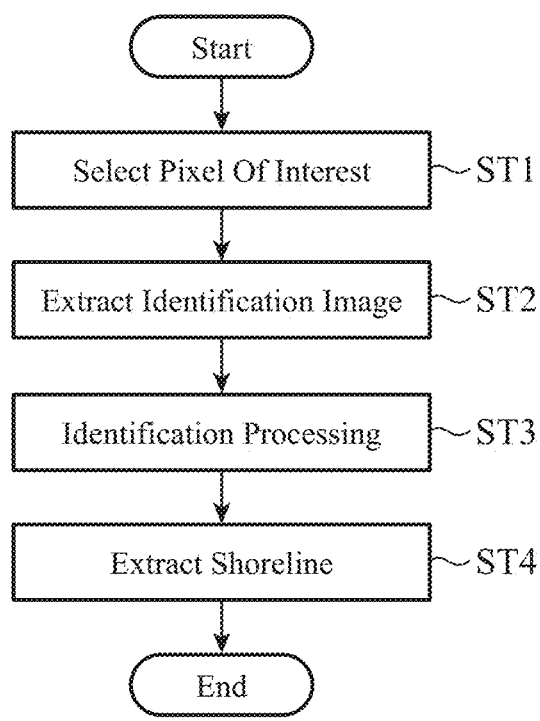
FIG. 4 is a flowchart illustrating a shoreline extraction method according to the first embodiment.

FIG. 4 is a flowchart illustrating a shoreline extraction method according to the first embodiment. Incidentally, it is assumed that machine learning related to identification between a water area and a non-water area by the learning unit 17 has been executed in a previous stage before a series of processing steps shown in FIG. 4 is executed.

First of all, the pixel selection unit 11 identifies a designated area (for example, an image area having 32×128 pixels) from a captured image captured by the monitoring camera 1, and selects a pixel of interest from the designated area (step ST1).

Next, the identification image extraction unit 12 extracts, as identification images, a plurality of image areas that come in contact with the pixel of interest selected by the pixel selection unit 11 (step ST2).

In a two-dimensional image plane of the captured image, an image that comes in contact with the top of the pixel of interest (for example, an image area having 64×64 pixels) is extracted as an identification image, and an image that comes in contact with the bottom of the pixel of interest (for example, an image area having 64×64 pixels) is extracted as an identification image.

The identification unit 13 calculates identification strengths for the respective identification images extracted in the step ST2, on the basis of a result of machine learning related to identification between a water area and a non-water area (step ST3). For example, in a case where an area corresponding to an identification image is a water area, the identification strength is 1.0, and in a case where the area corresponding to the identification image is a non-water area, the identification strength is 0.0. If the identification image evenly shows a water area and a non-water area, the identification strength is 0.5.

The shoreline extraction unit 14 extracts a shoreline in the captured image on the basis of the identification strengths calculated by the identification unit 13 (step ST4).

Next, details of the series of processing steps in FIG. 4 will be described.

Figure 5:
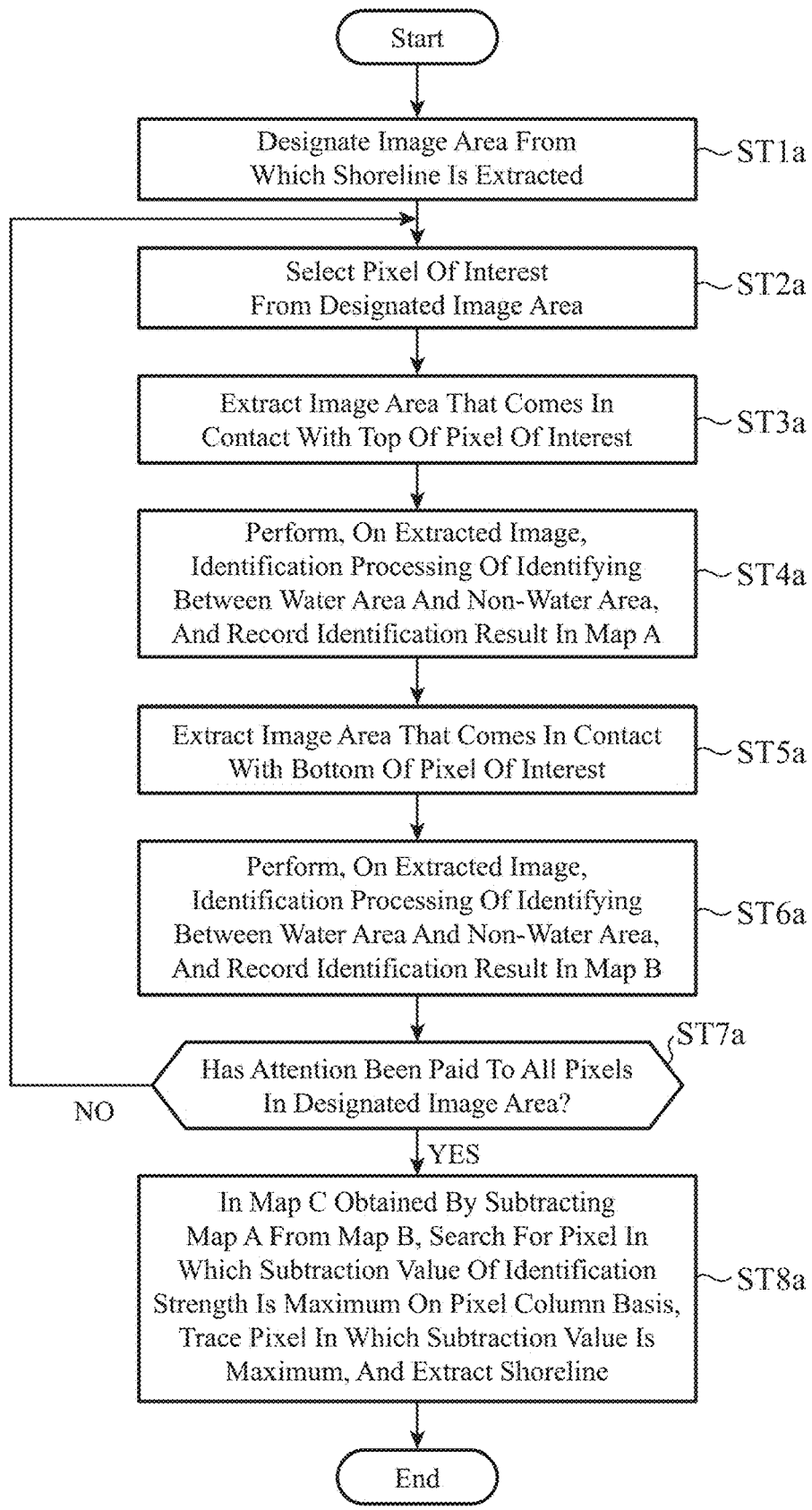
FIG. 5 is a flowchart illustrating details of the shoreline extraction method according to the first embodiment.

FIG. 5 is a flowchart illustrating details of the shoreline extraction method according to the first embodiment.

Processing of a step ST1a and a step ST2a in FIG. 5 corresponds to the processing of the step ST1 in FIG. 4. Processing of a step ST3a and a step ST5a in FIG. 5 corresponds to the processing of the step ST2 in FIG. 4. Processing of a step ST4a, a step ST6a and a step ST7a in FIG. 5 corresponds to the processing of the step ST3 in FIG. 4. Processing of a step ST8a in FIG. 5 corresponds to the processing of the step ST4 in FIG. 4.

From a captured image captured by the monitoring camera 1, the pixel selection unit 11 designates an image area from which a shoreline is extracted (step ST1a). FIG. 6 is a drawing illustrating an example of a captured image 300 captured by the monitoring camera 1.

In the step ST1a, the pixel selection unit 11 uses, as a designated area 301, an image area from which the shoreline is extracted, the image area being included in an image area a that shows the land which is the opposite shore from the monitoring camera 1, and that shows water of a river, in the captured image 300.

The designated area 301 is, for example, a long and narrow image area having 32×128 pixels. In this manner, by configuring the designated area 301 to be an image area that is vertically long in a two-dimensional image plane, an image area that shows the water's edge can be easily designated.

The pixel selection unit 11 selects a pixel of interest from the designated area 301 (step ST2a).

FIG. 7A is a drawing illustrating the designated area 301 designated from the captured image 300. As shown in FIG. 7A, the pixel selection unit 11 selects a pixel of interest 302 from the designated area 301.

For example, the pixel of interest is successively selected from all pixels of the designated area 301.

Next, the identification image extraction unit 12 extracts, as an identification image, an image area that comes in contact with the top of the pixel of interest in a two-dimensional image plane of the captured image 300 (step ST3a).

FIG. 7B is a drawing illustrating an identification image 303 that comes in contact with the top of the pixel of interest 302.

For example, the identification image extraction unit 12 extracts an image area having 64×64 pixels as the identification image 303, and outputs image data showing the identification image 303 to the identification unit 13.

The identification unit 13 performs, on the identification image 303 extracted by the identification image extraction unit 12, identification processing of identifying between a water area and a non-water area, and records an identification result in a map A (step ST4a). FIG. 7C is a drawing illustrating an outline of identification processing of identifying between a water area and a non-water area on the identification image 303 of FIG. 7B. The identification result is a result of identification processing of D/L by the identification unit 13, and is an identification strength indicating a degree to which an area shown in the identification image 303 is a water area.

The identification image 303 shows the land that is the opposite shore from the monitoring camera 1, and therefore the identification strength is a value close to 0.0. In the map A, the identification strength of the identification image 303 (the image area that comes in contact with the top of the pixel of interest) corresponding to each of all pixels of interest 302 selected from the designated area 301 is set.

Next, the identification image extraction unit 12 extracts, as an identification image, an image area that comes in contact with the bottom of the pixel of interest in the two-dimensional image plane of the captured image 300 (step ST5a).

Figure 8A:
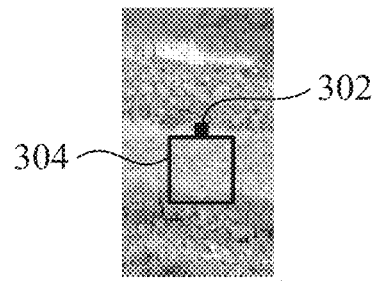
FIG. 8A is a drawing illustrating an identification image that comes in contact with the bottom of the pixel of interest.

FIG. 8A is a drawing illustrating an identification image 304 that comes in contact with the bottom of the pixel of interest 302.

For example, as with the identification image 303, the identification image extraction unit 12 extracts an image area having 64×64 pixels, and outputs image data showing the identification image 304 to the identification unit 13.

Figure 8B:
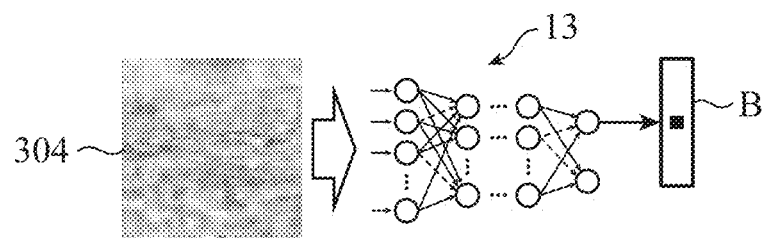
FIG. 8B is a drawing illustrating an outline of identification processing of identifying between a water area and a non-water area on the identification image of FIG. 8A.

The identification unit 13 performs, on the identification image 304 extracted by the identification image extraction unit 12, identification processing of identifying between a water area and a non-water area, and records an identification result in a map B (step ST6a). FIG. 8B is a drawing illustrating an outline of identification processing of identifying between a water area and a non-water area on the identification image 304 of FIG. 8A. The identification result is a result of identification processing of D/L by the identification unit 13, and is an identification strength indicating a degree to which an area shown in the identification image 304 is a water area.

The identification image 304 shows water of the river, and therefore the identification strength is a value close to 1.0. In the map B, the identification strength of the identification image 304 (the image area that comes in contact with the bottom of the pixel of interest) corresponding to each of all pixels of interest 302 selected from the designated area 301 is set.

Figure 9:
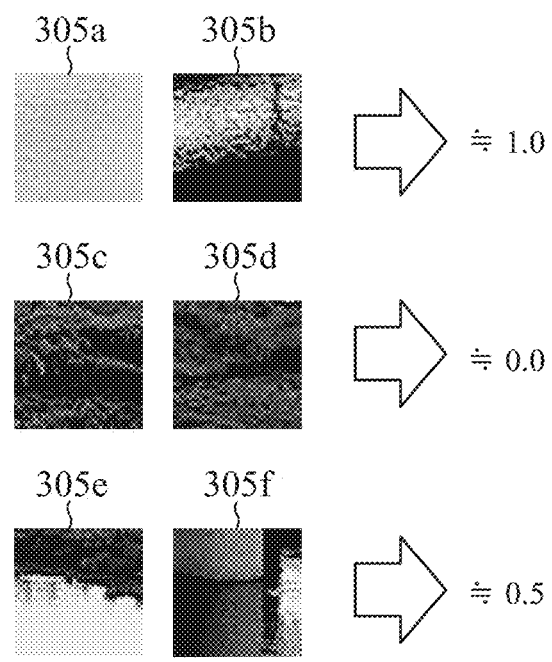
FIG. 9 is a drawing illustrating identification strengths of respective identification images in the first embodiment.

FIG. 9 is a drawing illustrating identification strengths of respective identification images in the first embodiment. As shown in FIG. 9, the identification strength is a real number having a range of values ranging from 0.0 to 1.0. An identification image 305a and an identification image 305b each show water of the river, and thus identification strengths thereof each are values close to 1.0.

Identification strengths of an identification image 305c and an identification image 305d each showing the land (non-water area) that is the opposite shore from the monitoring camera 1 each are values close to 0.0.

An identification image 305e shows the above-described opposite shore and water of the river, and an identification image 305f shows a bridge pier and water of the river. The identification images 305e, 305f each show a non-water area and a water area that are equally mixed, and therefore identification strengths thereof each are values close to 0.5.

Next, the identification unit 13 checks whether or not attention has been paid to all pixels in the designated area 301 (step ST7a). In a case where attention has been paid to all pixels in the designated area 301, in other words, in a case where all the pixels has been selected as pixels of interest (step ST7a; YES), the process proceeds to processing of a step ST8a.

In a case where the designated area 301 includes a pixel to which attention has not been paid, in other words, in a case where there is the pixel that has not been selected as a pixel of interest (step ST7a; NO), the process returns to the processing of the step ST2a. As the result, in the step ST2a, the pixel to which attention has not been paid in the designated area 301 is selected as a pixel of interest, and the series of processing steps from the step ST3a to the step ST7a is repeated.

Figure 10A:
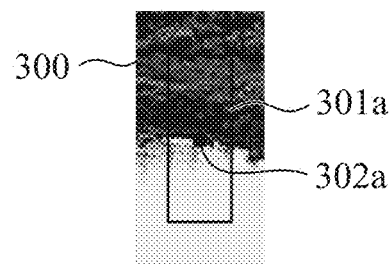
FIG. 10A is a drawing illustrating a captured image showing an area around the water's edge, a designated area, and a pixel of interest.
Figure 10B:
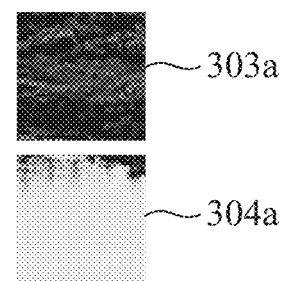
FIG. 10B is a drawing illustrating an identification image that comes in contact with the top of the pixel of interest, and an identification image that comes in contact with the bottom of the pixel of interest, in the designated area of FIG. 10A.

FIG. 10A is a drawing illustrating the captured image 300 that shows an area around the water's edge, a designated area 301a and a pixel of interest 302a, and shows a case where a pixel corresponding to the water's edge has been selected as the pixel of interest 302a. In addition, FIG. 10B is a drawing illustrating an identification image 303a that comes in contact with the top of the pixel of interest 302a, and an identification image 304a that comes in contact with the bottom of the pixel of interest 302a, in the designated area 301a of FIG. 10A.

The pixel of interest 302a is a pixel corresponding to the water's edge shown in the designated area 301a, and therefore an area corresponding to the identification image 303a is a non-water area. As the result, the identification strength of the identification image 303a is a value close to 0.0. The identification strength (0.0) of the identification image 303a corresponding to the pixel of interest 302a is recorded in the map A.

Meanwhile, an area corresponding to the identification image 304a is a water area, and therefore the identification strength thereof is a value close to 1.0. The identification strength (1.0) of the identification image 304a corresponding to the pixel of interest 302a is recorded in the map B. The series of processing steps from the step ST1a to the step ST6a has been described as above.

Figure 11A:
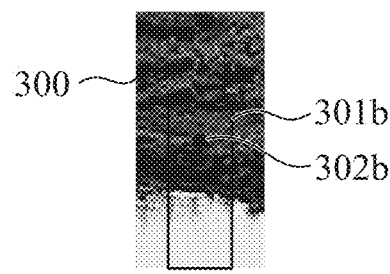
FIG. 11A is a drawing illustrating a captured image showing an area around the water's edge, a designated area, and a pixel of interest.
Figure 11B:
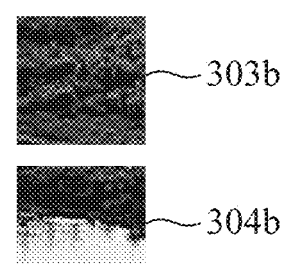
FIG. 11B is a drawing illustrating an identification image that comes in contact with the top of the pixel of interest, and an identification image that comes in contact with the bottom of the pixel of interest, in the designated area of FIG. 11A.

FIG. 11A is a drawing illustrating the captured image 300 that shows an area around the water's edge, a designated area 301b and a pixel of interest 302b, and shows a case where a pixel that is located on the upper side than the pixel of interest 302a shown in FIG. 10A has been selected as the pixel of interest 302b in the two-dimensional image plane of the captured image 300. FIG. 11B is a drawing illustrating an identification image 303b that comes in contact with the top of the pixel of interest 302b, and an identification image 304b that comes in contact with the bottom of the pixel of interest 302b, in the designated area 301b of FIG. 11A.

The pixel of interest 302b is a pixel corresponding to the land (opposite shore) shown in the designated area 301b, and therefore an area corresponding to the identification image 303b is a non-water area. As the result, the identification strength of the identification image 303b is a value close to 0.0. The identification strength (0.0) of the identification image 303b corresponding to the pixel of interest 302b is recorded in the map A.

Meanwhile, a water area and a non-water area are mixed in an area corresponding to the identification image 304b, and therefore the identification strength is a value close to 0.5. The identification strength (0.5) of the identification image 304b corresponding to the pixel of interest 302b is recorded in the map B.

Incidentally, when a pixel that is located on the lower side than the pixel of interest 302a shown in FIG. 10A has been selected as a pixel of interest in the two-dimensional image plane of the captured image 300, a water area and a non-water area are mixed in an area corresponding to an identification image that comes in contact with the top of this pixel of interest. Therefore, the identification strength is a value close to 0.5. In this case, the identification strength (0.5) of the identification image corresponding to the above-described pixel of interest is recorded in the map A. An area corresponding to an identification image that comes in contact with the bottom of the above-described pixel of interest is a water area, and therefore the identification strength is a value close to 1.0. In this case, the identification strength (1.0) of the identification image corresponding to the above-described pixel of interest is recorded in the map B.

In the step ST8a, the shoreline extraction unit 14 subtracts the identification strength that has been recorded in the map A for each of positions of the pixels of interest from the identification strength that has been recorded in the map B for each of the positions of the pixels of interest so as to obtain a map C. In the map C, a subtraction value of identification strength is recorded for each of the positions of the pixels of interest. For each pixel column in the map C, the shoreline extraction unit 14 searches for a pixel in which a subtraction value of identification strength is the maximum, and traces the pixel for each pixel column in search result, and thereby extracts the shoreline shown in the captured image 300.

It should be noted that although FIG. 5 shows processing for the designated area 301 selected from the captured image 300, the water level measurement device 100 may successively select designated areas from the captured image 300, and execute processing shown in FIG. 5 on each of the designated areas.

In addition, although the case where an image area having 32×128 pixels is designated as a designated area has been described, the image area's size is not limited to this size. For example, the designated area may be an image area having 64×64 pixels.

Moreover, although the case where an image area having 64×64 pixels is extracted as an identification image has been shown, the image area's size is not limited to this size. For example, the image area's size may be larger than or smaller than this size within a range within which an operation load of identification processing does not increase.

Moreover, although the case where a rectangular area is designated or extracted as an image area has been shown, an area other than the rectangle may be designated or extracted. For example, a circular area may be designated or extracted.

As described above, in the water level measurement device 100 according to the first embodiment, the learning image extraction unit 16 extracts an image corresponding to a water area and an image corresponding to a non-water area from the captured image 300 captured by the monitoring camera 1. The learning unit 17 executes machine learning related to identification between the water area and the non-water area by using the images extracted by the learning image extraction unit 16.

The pixel selection unit 11 selects the pixel of interest 302 from the designated area 301 designated from the captured image 300, and the identification image extraction unit 12 extracts the identification images 303, 304 each coming in contact with the pixel of interest 302. The identification unit 13 calculates an identification strength indicating a degree to which an area corresponding to each of the identification images 303, 304 is a water area, on the basis of the result of machine learning related to identification between the water area and the non-water area. The shoreline extraction unit 14 extracts a shoreline in the captured image from the identification strength of the area corresponding to each of the identification images 303, 304, on the basis of the result of machine learning related to the identification between the water area and the non-water area by the learning unit 17.

Thus, the shoreline can be extracted from the result of machine learning with high accuracy, which enables stable measurement of the water level on the basis of the position of the shoreline.

Second Embodiment

Figure 12:
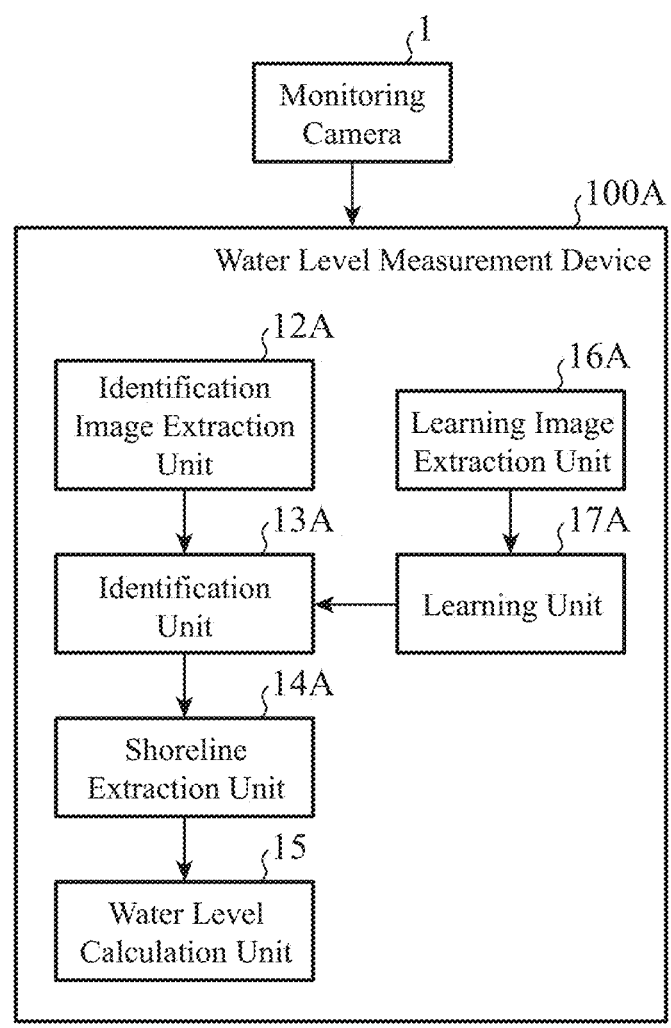
FIG. 12 is a block diagram illustrating a configuration of a water level measurement device according to a second embodiment of the present invention.

FIG. 12 is a block diagram illustrating a configuration of a water level measurement device 100A according to a second embodiment of the present invention. In FIG. 12, components identical to those shown in FIG. 1 are denoted by the same reference numerals, and the explanation thereof will be omitted. The water level measurement device 100A is a device that measures the water level of a river by using images captured by the monitoring camera 1, and is provided with an identification image extraction unit 12A, an identification unit 13A, a shoreline extraction unit 14A, the water level calculation unit 15, a learning image extraction unit 16A and a learning unit 17A.

The identification image extraction unit 12A extracts a plurality of identification images from a designated area in a captured image captured by the monitoring camera 1. For example, the identification image extraction unit 12A extracts, as an identification image, an image having 64×64 pixels from the designated area of the captured image. Data indicating the identification images extracted by the identification image extraction unit 12A is output to the identification unit 13A.

The identification unit 13A calculates an identification strength indicating a degree to which an area corresponding to each of the plurality of identification images is the water's edge, on the basis of a result of machine learning related to identification between a water area, the water's edge and a non-water area by the learning unit 17A.

As with the first embodiment, the identification strength is a value indicating a degree to which an area corresponding to each of a plurality of identification images is a water area. For example, in a case where the area corresponding to the identification image is a water area, the identification strength is 1.0, and in a case where the area corresponding to the identification image is a non-water area, the identification strength is 0. In addition, in a case where the identification image shows a water area and a non-water area, the identification strength is 0.5.

The shoreline extraction unit 14A calculates a position of the shoreline in the captured image on the basis of the identification strength calculated by the identification unit 13A. For example, the shoreline extraction unit 14A calculates a position of the shoreline by using the identification strengths of the plurality of respective identification images.

Figure 13:
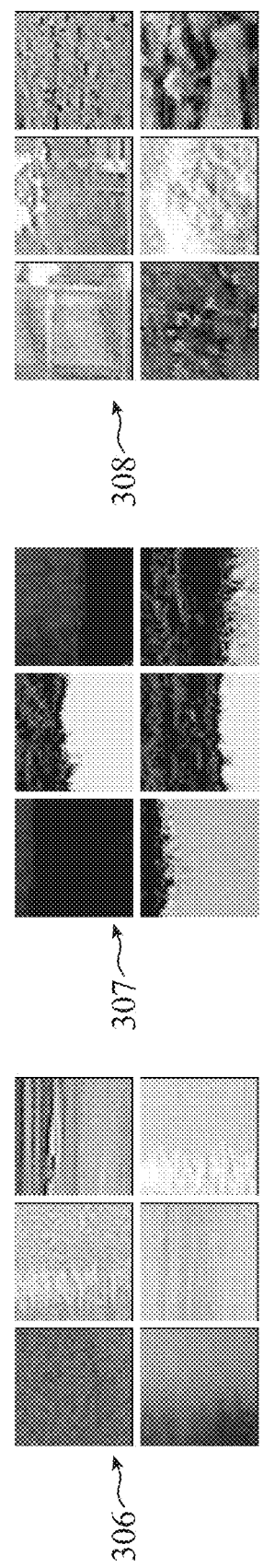
FIG. 13 is a drawing illustrating an example of learning images.

The learning image extraction unit 16A extracts a learning image from the captured image captured by the monitoring camera 1. FIG. 13 is a drawing illustrating learning images 306 to 308. As shown in FIG. 13, the learning image extraction unit 16A extracts learning images 306 each of which shows water of the river in the captured image, learning images 307 each of which shows an area around the water's edge of the river in the captured image, and learning images 308 each of which shows a non-water area other than the river in the captured image.

The learning unit 17A executes machine learning related to identification between a water area, the water's edge and a non-water area, by using the learning images 306 to 308 extracted by the learning image extraction unit 16A.

For example, by performing machine learning that uses a D/L in which the above-described learning images are used as teacher data, the learning unit 17A obtains a result of machine learning by which image data input into the identification unit 13A is output as identification strengths for three categories of a water area, the water's edge and a non-water area. The result of the machine learning by the learning unit 17A is output to the identification unit 13A.

As with FIG. 2A, the respective functions of the identification image extraction unit 12A, the identification unit 13A, the shoreline extraction unit 14A, the water level calculation unit 15, the learning image extraction unit 16A and the learning unit 17A may be implemented by the processing circuit 200 that is dedicated hardware. In addition, as with FIG. 2B, the functions may be implemented by causing the processor 201 to read a program stored in the memory 202, and then to execute the program. In this manner, the processing circuit is capable of implementing each of the above-described functions by hardware, software, firmware, or a combination thereof.

The water level measurement device 100A provided with the identification image extraction unit 12A, the identification unit 13A, the shoreline extraction unit 14A, the water level calculation unit 15, the learning image extraction unit 16A and the learning unit 17A has been described above. However, the configuration of the water level measurement device 100A is not limited to this configuration. For example, the learning image extraction unit 16A and the learning unit 17A may be configured to be included in an external device that is provided independently of the water level measurement device 100A. In this case, the identification unit 13A performs identification processing by using the result of machine learning performed in the above-described external device. In other words, the water level measurement device 100A according to the second embodiment has only to be provided with the identification image extraction unit 12A, the identification unit 13A, the shoreline extraction unit 14A and the water level calculation unit 15. Thus, the learning image extraction unit 16A and the learning unit 17A may be excluded from the configuration of the water level measurement device 100A.

Next, operation will be described.

Figure 14:
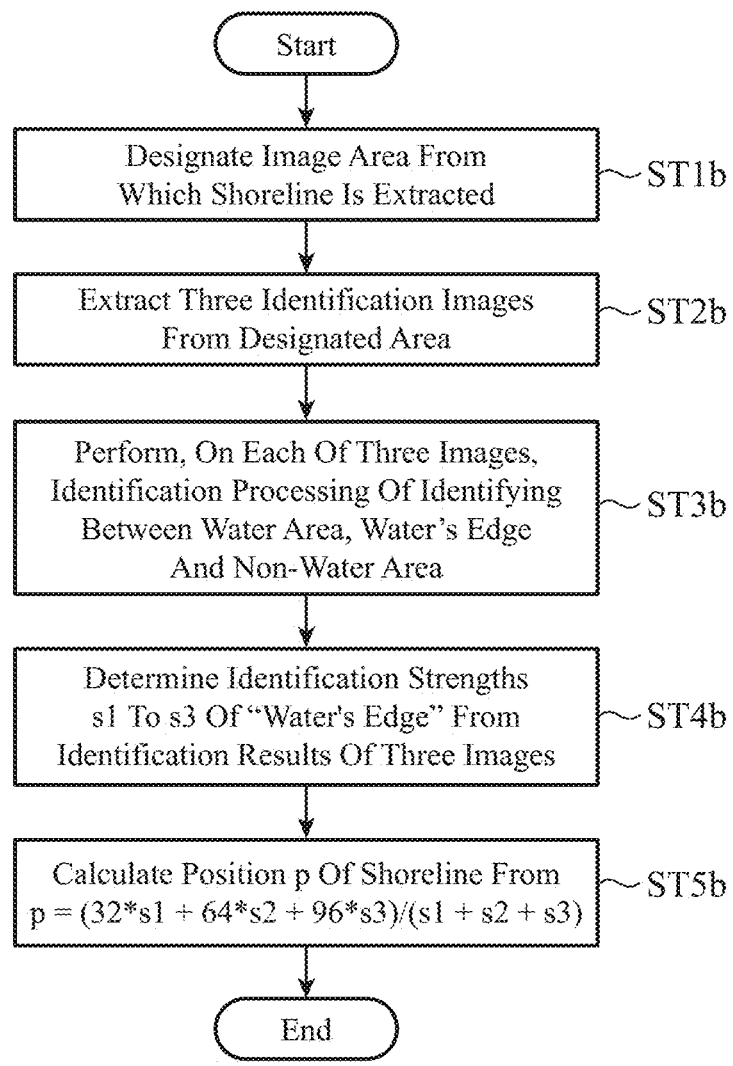
FIG. 14 is a flowchart illustrating a shoreline extraction method according to the second embodiment.

FIG. 14 is a flowchart illustrating a shoreline extraction method according to the second embodiment.

Incidentally, it is assumed that machine learning related to identification between a water area, the water's edge and a non-water area by the learning unit 17A has been executed in a previous stage before a series of processing steps shown in FIG. 14 is executed.

First of all, from the captured image captured by the monitoring camera 1, the identification image extraction unit 12A designates an image area in which a shoreline is extracted (step ST1b).

Figure 15A:
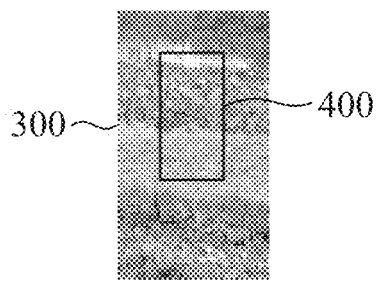
FIG. 15A is a drawing illustrating a captured image and a designated area.

FIG. 15A is a drawing illustrating a captured image 300 and a designated area 400. In the step ST1b, in the captured image 300, the identification image extraction unit 12A designates the designated area 400 that is an image area from which the shoreline is extracted. For example, an image area having 64×128 pixels is designated.

Figure 15B:
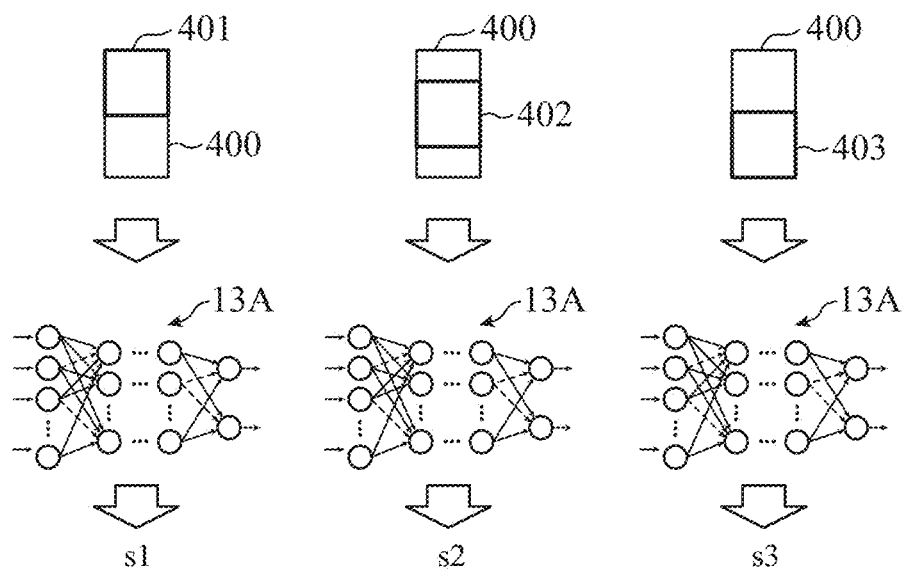
FIG. 15B is a diagram illustrating an outline of identification processing of identifying between a water area and a non-water area on the identification image of FIG. 15A.

Next, the identification image extraction unit 12A extracts three identification images from the designated area 400 (step ST2b). FIG. 15B is a diagram illustrating an outline of identification processing of identifying between a water area and a non-water area on the identification images of FIG. 15A. As shown in FIG. 15B, the identification image extraction unit 12A extracts three identification images 401, 402, 403 each having 64×64 pixels from the designated area 400. Image data indicating each of the identification images 401, 402, 403 extracted by the identification image extraction unit 12A is output to the identification unit 13A.

The identification unit 13A performs, on each of the identification images 401, 402, 403 extracted by the identification image extraction unit 12A, identification processing of identifying between a water area, the water's edge and a non-water area (step ST3b). Consequently, the identification unit 13A determines, as identification results, an identification strength s1 of "the water's edge" for an identification image 401, an identification strength s2 of "the water's edge" for an identification image 402, and an identification strength s3 of "the water's edge" for an identification image 403.

The identification strength of "the water's edge" is a result of identification processing of D/L by the identification unit 13A, and is a real number value indicating a degree to which an area corresponding to an identification image is an area that includes the water's edge.

The shoreline extraction unit 14A calculates a position p of the shoreline in the captured image 300, on the basis of the above-described identification strengths s1 to s3 calculated by the identification unit 13A.

For example, the shoreline extraction unit 14A allocates the identification image 401, the identification image 402 and the identification image 403 successively from the upper side of the designated area 400 by sequentially increasing by 32 pixels from the upper side of the designated area 400, and extracts the position p of the shoreline from the undermentioned equation (1).

$$p=(32\times s1+64\times s2+96\times s3)/(s1+s2+s3) \quad (1)$$

The water level calculation unit 15 calculates the water level within the image capturing range of the monitoring camera 1, on the basis of the position p of the shoreline calculated by the shoreline extraction unit 14A. For example, as with the first embodiment, correspondence data in which each pixel position of a pixel column in the up-and-down direction in the two-dimensional image plane of the designated area described above is associated with a water level value of the river is set in the water level calculation unit 15. The water level calculation unit 15 calculates a water level value of the river with reference to the correspondence data, on the basis of a pixel position corresponding to the shoreline.

It should be noted that although the case where the position p of the shoreline is calculated by 32 pixel increments in the designated area 400 has been shown, this is merely an example, and pixel increments other than 32 pixel increments may be employed.

As described above, in the water level measurement device 100A according to the second embodiment, the learning image extraction unit 16A extracts an image corresponding to a water area, an image corresponding to the water's edge and an image corresponding to a non-water area from the captured image 300 captured by the monitoring camera 1. The learning unit 17A executes machine learning related to identification between a water area, the water's edge and a non-water area by using the images extracted by the learning image extraction unit 16A.

The identification image extraction unit 12A extracts the identification images 401 to 403 from the designated area 400 of the captured image 300. The identification unit 13A calculates an identification strength indicating a degree to which an area corresponding to each of the identification images 401 to 403 is the water's edge, on the basis of a result of machine learning related to identification between a water area, the water's edge and a non-water area by the learning unit 17A. The shoreline extraction unit 14A calculates a position p of the shoreline on the basis of the identification strength calculated by the identification unit 13A. The water level calculation unit 15 calculates the water level within the image capturing range of the monitoring camera 1, on the basis of the position p of the shoreline calculated by the shoreline extraction unit 14A.

Even when such a configuration is employed, the shoreline can be extracted from the result of machine learning with high accuracy, which enables stable measurement of the water level on the basis of the position of the shoreline.

Third Embodiment

Figure 16:
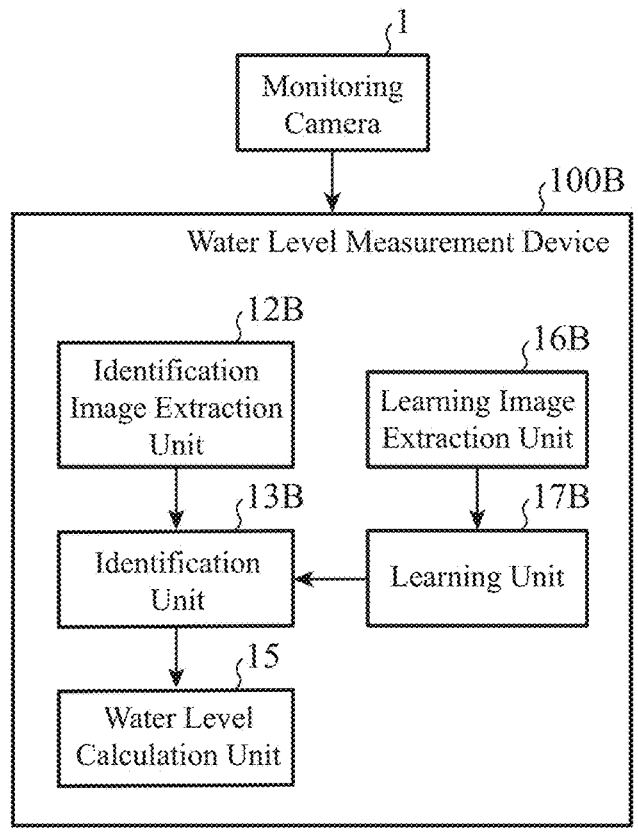
FIG. 16 is a block diagram illustrating a configuration of a water level measurement device according to a third embodiment of the present invention.

FIG. 16 is a block diagram illustrating a configuration of a water level measurement device 100B according to a third embodiment of the present invention. In FIG. 16, components identical to those shown in FIG. 1 are denoted by the same reference numerals, and the explanation thereof will be omitted. The water level measurement device 100B is a device that measures the water level of a river by using images captured by the monitoring camera 1, and is provided with an identification image extraction unit 12B, an identification unit 13B, the water level calculation unit 15, a learning image extraction unit 16B and a learning unit 17B.

The identification image extraction unit 12B extracts an identification image from a captured image captured by the monitoring camera 1. For example, the identification image extraction unit 12B designates an image having 64×128 pixels from the captured image, and extracts the image as an identification image. Data indicating the identification image extracted by the identification image extraction unit 12B is output to the identification unit 13B.

The identification unit 13B identifies the position p of the shoreline in the identification image on the basis of a result of machine learning related to identification of the water's edge by the learning unit 17B. For example, the identification unit 13B determines the image position whose identification strength of the water's edge is the highest, to be the position p of the shoreline in the input identification image.

The learning image extraction unit 16B extracts a learning image from the captured image captured by the monitoring camera 1. For example, the learning image extraction unit 16B extracts, as a learning image, an image area having 64×128 pixels from the captured image, and outputs the learning image to the learning unit 17B as teacher data.

Moreover, the learning image extraction unit 16B defines a position of the water's edge in the learning image, as any one of seven categories (16, 32, 48, 64, 80, 96, 112 pixels) which are obtained by successively increasing by 16 pixels from the upper side of the image, and outputs the position to the learning unit 17B as teacher data.

For example, a certain learning image shows the water's edge in proximity to a 64 pixel position from the upper side of the image, and another learning image shows the water's edge in proximity to a 112 pixel position from the upper side of the image.

The learning unit 17B executes machine learning related to identification of the water's edge by using the above-described teacher data obtained by the learning image extraction unit 16B. For example, by performing machine learning that uses a D/L in which the above-described learning image is used as teacher data, the learning unit 17B obtains a result of machine learning by which identification strengths for the above-described seven categories in the image data input by the identification unit 13B are output. The result of the machine learning by the learning unit 17B is output to the identification unit 13B.

As with FIG. 2A, the respective functions of the identification image extraction unit 12B, the identification unit 13B, the water level calculation unit 15, the learning image extraction unit 16B and the learning unit 17B may be implemented by the processing circuit 200 that is dedicated hardware. In addition, as with FIG. 2B, the functions may be implemented by causing the processor 201 to read a program stored in the memory 202, and then to execute the program. In this manner, the processing circuit is capable of implementing each of the above-described functions by hardware, software, firmware, or a combination thereof.

The water level measurement device 100B provided with the identification image extraction unit 12B, the identification unit 13B, the water level calculation unit 15, the learning image extraction unit 16B and the learning unit 17B has been described above. However, the configuration of the water level measurement device 100B is not limited to this configuration. For example, the learning image extraction unit 16B and the learning unit 17B may be configured to be included in an external device that is provided independently of the water level measurement device 100B. In this case, the identification unit 13B performs identification processing by using the result of machine learning performed in the external device. In other words, the water level measurement device 100B according to the third embodiment has only to be provided with the identification image extraction unit 12B, the identification unit 13B and the water level calculation unit 15. Thus, the learning image extraction unit 16B and the learning unit 17B may be excluded from the configuration of the water level measurement device 100B.

Next, operation will be described.

Figure 17:
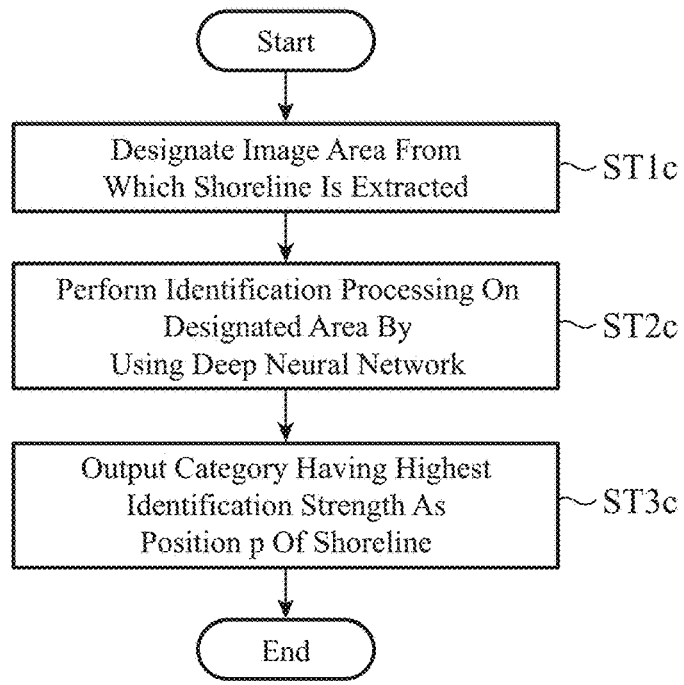
FIG. 17 is a flowchart illustrating another mode of a shoreline extraction method according to the third embodiment.

FIG. 17 is a flowchart illustrating a shoreline extraction method according to the third embodiment.

Incidentally, it is assumed that machine learning related to identification of the water's edge by the learning unit 17B has been executed in a previous stage before a series of processing steps shown in FIG. 17 is executed.

Figure 18A:
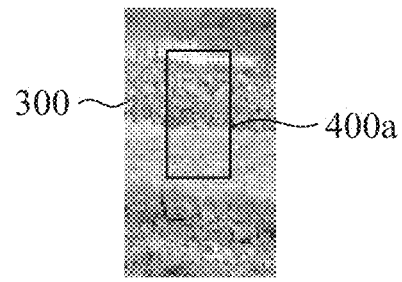
FIG. 18A is a drawing illustrating a captured image and an identification image.
Figure 18B:
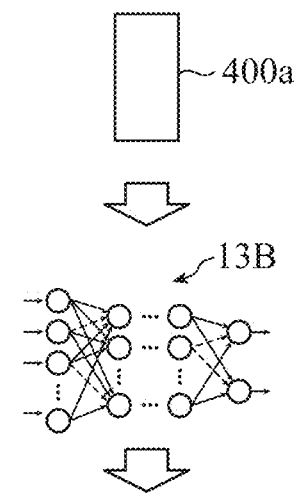
FIG. 18B is a diagram illustrating an outline of identification processing of identifying between a water area and a non-water area on the identification image of FIG. 18A.

From a captured image captured by the monitoring camera 1, the identification image extraction unit 12B designates an image area from which the shoreline is extracted, and outputs the image area to the identification unit 13B as an identification image (step ST1c). FIG. 18A is a drawing illustrating the captured image 300 and an identification image 400a. For example, as shown in FIG. 18A, the identification image extraction unit 12B designates, from the captured image 300, an image area having 64×128 pixels from which the shoreline is extracted, and outputs the image area to the identification unit 13B as the identification image 400a.

The identification unit 13B performs identification processing of the identification image 400a, on the basis of a result of machine learning related to identification of the water's edge using a D/L (step ST2c).

For example, among the identification strengths of the water's edge for the above-described seven categories in the input identification image 400a, the identification unit 13B identifies, as the position p of the shoreline, an image position corresponding to the category having the highest identification strength.

The water level calculation unit 15 calculates the water level within the image capturing range of the monitoring camera 1, on the basis of the position p of the shoreline calculated by the identification unit 13B. For example, as with the first embodiment, correspondence data in which each pixel position of a pixel column in the up-and-down direction in the two-dimensional image plane of the designated area described above is associated with a water level value of the river is set in the water level calculation unit 15. The water level calculation unit 15 calculates a water level value of the river with reference to the correspondence data, on the basis of a pixel position corresponding to the shoreline.

It should be noted that although the case where the identification image 400a is identified for each category by 16 pixel increments has been shown, this is merely an example, and pixel increments other than 16 pixel increments may be used.

Figure 19:
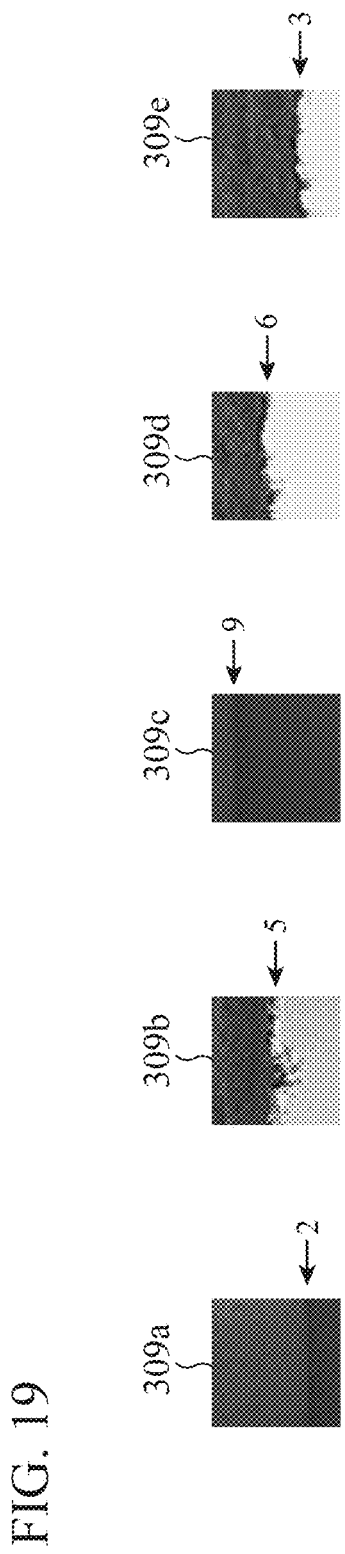
FIG. 19 is a drawing illustrating learning images each of which uses a position of a shoreline as a label of teacher data.

FIG. 19 is a drawing illustrating learning images 309a to 309e each of which uses a position of a shoreline as a label of teacher data. The learning image extraction unit 16B extracts learning images 309a to 309e from the captured image captured by the monitoring camera 1. At this point, the learning image extraction unit 16B may use, as labels of teacher data, respective positions of shorelines of the learning images 309a to 309e.

The learning unit 17B performs machine learning related to identification of the water's edge, the machine learning using a D/L in which a position of a shoreline is used as a label of teacher data. For example, in a case where a label "2" is set at a shoreline between a bridge pier and water of the river in the learning image 309a, the learning unit 17B obtains a result of machine learning by which the label "2" is output with respect to the image that shows the shoreline between the bridge pier and water of the river.

When the identification image 400a is input, the identification unit 13B outputs a label of a position of a shoreline in the identification image 400a.

For example, in a case where the identification image 400a shows the shoreline between the bridge pier and water of the river, the identification unit 13B outputs the label "2" as described above. Moreover, the identification unit 13B calculates the position p of the shoreline between the bridge pier and water of the river in the identification image 400a. Even when the processing is performed in such a manner, the position of the shoreline can be correctly identified from the identification image.

As described above, in the water level measurement device 100B according to the third embodiment, the learning image extraction unit 16B extracts an image corresponding to a water area, an image corresponding to the water's edge and an image corresponding to a non-water area from the captured image 300 captured by the monitoring camera 1. The learning unit 17B executes machine learning related to identification of the water's edge by using the images extracted by the learning image extraction unit 16B. The identification image extraction unit 12B extracts the identification image 400a from the captured image 300. The identification unit 13B identifies the position p of the shoreline in the identification image 400a, on the basis of the result of machine learning related to identification of the water's edge by the learning unit 17B. The water level calculation unit 15 calculates the water level within the image capturing range of the monitoring camera 1, on the basis of the position p of the shoreline identified by the identification unit 13B. Even when such a configuration is employed, the shoreline can be extracted with high accuracy, which enables stable measurement of the water level on the basis of the position of the shoreline.

In the water level measurement device 100B according to the third embodiment, the learning unit 17B executes machine learning related to identification of the water's edge, by using, as a label of teacher data, the position of the shoreline in the learning image extracted by the learning image extraction unit 16B. Consequently, the position of the shoreline can be correctly identified from the identification image.

Fourth Embodiment

Figure 20:
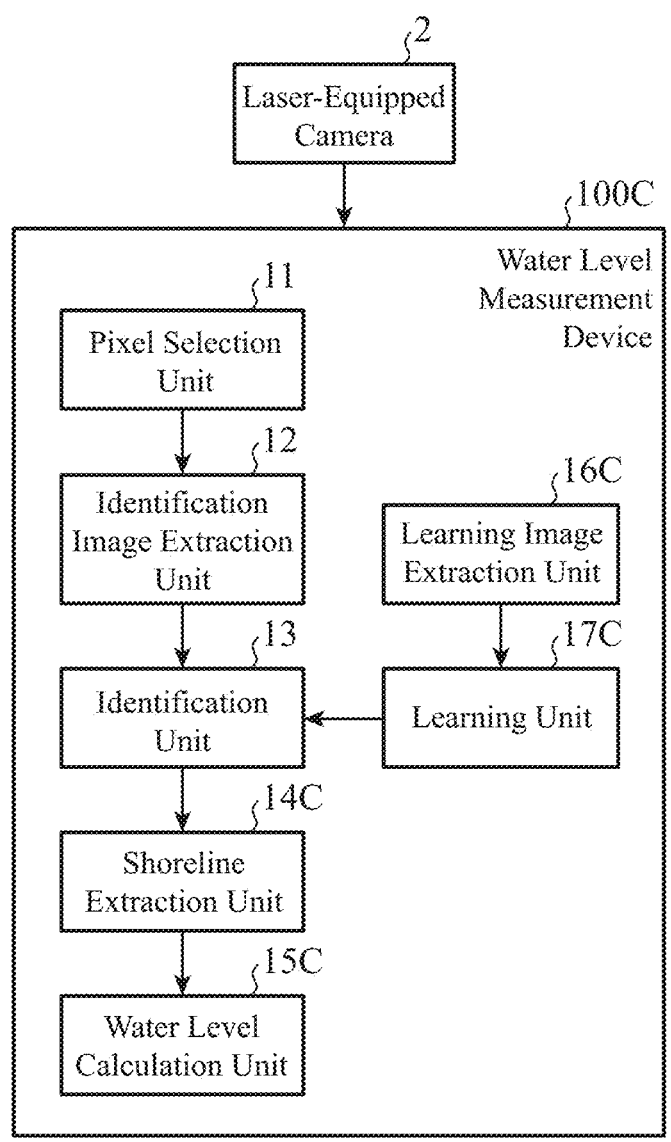
FIG. 20 is a block diagram illustrating a configuration of a water level measurement device according to a fourth embodiment of the present invention.

FIG. 20 is a block diagram illustrating a configuration of a water level measurement device 100C according to a fourth embodiment of the present invention. In FIG. 20, components identical to those shown in FIG. 1 are denoted by the same reference numerals, and the explanation thereof will be omitted. The water level measurement device 100C is a device that measures the water level of a river, by using an image captured and three-dimensional measured data measured by a laser-equipped camera 2. In addition, the water level measurement device 100C is provided with the pixel selection unit 11, the identification image extraction unit 12, the identification unit 13, a shoreline extraction unit 14C, a water level calculation unit 15C, a learning image extraction unit 16C and a learning unit 17C.

The laser-equipped camera 2 is arranged around a river or the like that is a target of water level measurement, and captures an image of the target of the water level measurement. In addition, the laser-equipped camera 2 includes a distance measurement laser, and by performing three-dimensional laser scanning within an image capturing range, can measure three-dimensional information on a pixel basis within the image capturing range. For example, world coordinates (latitude, longitude, altitude) at a laser measurement point can be obtained.

The laser-equipped camera 2 outputs image data showing a captured image, and three-dimensional measured data to the water level measurement device 100C.

The shoreline extraction unit 14C extracts a shoreline in the captured image on the basis of the identification strength calculated by the identification unit 13. Moreover, the shoreline extraction unit 14C searches for three-dimensional measured data corresponding to a position of the shoreline, and associates the three-dimensional information (for example, latitude, longitude, altitude) with the shoreline.

The water level calculation unit 15C calculates the water level within the image capturing range of the monitoring camera 1, on the basis of the position of the shoreline extracted by the shoreline extraction unit 14C, and the three-dimensional information corresponding thereto.

For example, by identifying altitude from the three-dimensional information corresponding to the position of the shoreline, the water level calculation unit 15C may determine the water level corresponding to the identified altitude from correspondence data between altitude and water levels of the river.

The learning image extraction unit 16C extracts a learning image from the captured image captured by the monitoring camera 1, and outputs the learning image to the learning unit 17C. Moreover, the learning image extraction unit 16C receives three-dimensional measured data of an area corresponding to the learning image from the laser-equipped camera 2, and outputs the three-dimensional measured data to the learning unit 17C.

The learning unit 17C executes machine learning related to identification between a water area and a non-water area by using the learning image extracted by the learning image extraction unit 16C. For example, the learning unit 17C may perform machine learning by which three-dimensional measured data corresponding to image data that has been input into the identification unit 13 is output, by using the learning image as teacher data. A result of the machine learning by the learning unit 17C is output to the identification unit 13.

It should be noted that in the fourth embodiment, although the case where the laser-equipped camera 2 is applied to the configuration shown in the first embodiment has been shown, the laser-equipped camera 2 may be applied to the configuration shown in each of the second and third embodiments.

As described above, in the water level measurement device 100C according to the fourth embodiment, the water level calculation unit 15B calculates the water level within the image capturing range of the laser-equipped camera 2, on the basis of three-dimensional measured data by the laser-equipped camera 2. Even when such a configuration is employed, the shoreline can be extracted with high accuracy, which enables stable measurement of the water level on the basis of the position of the shoreline.

It should be noted that the present invention is not limited to the above-described embodiments, and the embodiments may be combined as appropriate, or any component may be modified or omitted in each of the embodiments, within the scope of the present invention.

INDUSTRIAL APPLICABILITY

According to the present invention, a shoreline in a captured image can be extracted on the basis of, for example, the result of machine learning related to identification between a water area and a non-water area in each of image areas designated from the captured image, and therefore the present invention is suitable for the use of a shoreline extraction method for extracting a shoreline in a captured image by using an image captured by a monitoring camera, and is suitable for the use of, for example, a water level measurement device that measures the water level of a river or the like within an image capturing range on the basis of a shoreline.

REFERENCE SIGNS LIST

1: monitoring camera, 2: laser-equipped camera, 11: pixel selection unit, 12, 12A, 12B: identification image extraction unit, 13, 13A, 13B: identification unit, 14, 14A, 14C: shoreline extraction unit, 15, 15B, 15C: water level calculation unit, 16, 16A to 16C: learning image extraction unit, 17, 17A to 17C: learning unit, 100, 100A to 100C: water level measurement device, 200: processing circuit, 201: processor, 202: memory, 300: captured image, 301, 301a, 301b: designated area, 302, 302a, 302b: pixel of interest, 303, 303a, 303b, 304, 304a, 304b, 305a to 305f, 400a, 401 to 403: identification image, 306 to 308, 309a to 309e: learning image, 400: designated area.

The invention claimed is:
1. A water level measurement device comprising:
processing circuitry to
successively select pixels of interest from an image area designated from a captured image captured by a monitoring camera;
upon selection of each pixel of interest,
extract, as identification images, a plurality of image areas that come in contact with the currently-selected pixel of interest,
calculate an identification strength indicating a degree to which an area corresponding to each of the plurality of identification images corresponding to the currently-selected pixel is a water area, on a basis of a result of machine learning related to identification between the water area and a non-water area, and
calculate an evaluation value of the currently-selected pixel on the basis of the identification strengths of the corresponding plurality of identification images;
extract a subset of the pixels of interest as a shoreline in the captured image on a basis of comparison of the evaluation values calculated for the respective pixels of interest; and
calculate a water level within an image capturing range of the monitoring camera on a basis of the shoreline extracted.
2. The water level measurement device according to claim 1, wherein the processing circuitry
extracts a learning image from the captured image; and
executes the machine learning related to the identification between the water area and the non-water area by using the learning image extracted.

3. The water level measurement device according to claim 1, wherein
the monitoring camera is a camera having a function of three-dimensional measurement within the image capturing range, and
the processing circuitry calculates the water level within the image capturing range of the monitoring camera, on a basis of three-dimensional measured data by the monitoring camera.
4. A water level measurement device comprising:
processing circuitry to
successively extract sets of identification images from an image area designated from a captured image captured by a monitoring camera, each set comprising a pair of identification images one of which is directly above the other in the captured image;
upon extraction of each set of identification images,
calculate an identification strength indicating a degree to which an area corresponding to each identification image in the currently-extracted set of identification images is an water's edge, on a basis of a result of machine learning related to identification between a water area, the water's edge and a non-water area, and
calculate an evaluation value for the currently-extracted set of identification images on a basis of the respective identification strengths;
calculate a position of a shoreline in the captured image by comparing the evaluation values of the respective sets of identification images and determining, on a basis of the comparison, the sets in which both identification images come into contact with the shoreline; and
calculate a water level within an image capturing range of the monitoring camera on a basis of a position of the shoreline calculated.
5. The water level measurement device according to claim 4, wherein the processing circuitry
extracts a learning image from the captured image; and
executes the machine learning related to the identification between the water area, the water's edge and the non-water area by using the learning image extracted.
6. A water level measurement device comprising: processing circuitry to successively extract pairs of identification images from a captured image captured by a monitoring camera, each pair including one identification image that is above the other in the captured image; identify a position of a shoreline in the captured image, on a basis of a result of machine learning related to identification of each of the identification images in the extracted pairs as one of a water area, a waters edge and a non-water area; and calculate a water level within an image capturing range of the monitoring camera on a basis of the position of the shoreline identified.
7. The water level measurement device according to claim 6, wherein the processing circuitry
extracts a learning image from the captured image; and
executes machine learning related to identification of the water's edge by using the learning image extracted.
8. The water level measurement device according to claim 7, wherein
the processing circuitry executes the machine learning related to the identification of the water's edge, by using, as a label of teacher data, a position of a shoreline in the learning image extracted.

9. A shoreline extraction method comprising:
- selectively selecting pixels of interest from an image area designated from a captured image captured by a monitoring camera;
- upon selection of each pixel of interest,
  - extracting, as identification images, a plurality of image areas that come in contact with the currently-selected pixel of interest;
  - calculating an identification strength indicating a degree to which an area corresponding to each of the plurality of identification images corresponding to the currently-selected pixel is a water area, on a basis of a result of machine learning related to identification between the water area and a non-water area, and
  - calculating an evaluation value of the currently-selected pixel on the basis of the identification strengths of the corresponding plurality of identification images; and
- extracting a subset of the pixels of interest as a shoreline in the captured image on a basis of comparison of the evaluation values calculated for the respective pixels of interest.

* * * * *